US008822846B2

(12) United States Patent
Okuyama

(10) Patent No.: US 8,822,846 B2
(45) Date of Patent: Sep. 2, 2014

(54) CABLE HOLDING STRUCTURE

(75) Inventor: Ken Okuyama, Hitachi (JP)

(73) Assignee: Hitachi Metals, Ltd., Tokyo (JP)

( * ) Notice: Subject to any disclaimer, the term of this patent is extended or adjusted under 35 U.S.C. 154(b) by 55 days.

(21) Appl. No.: 13/585,262

(22) Filed: Aug. 14, 2012

(65) Prior Publication Data

US 2013/0043069 A1 Feb. 21, 2013

(30) Foreign Application Priority Data

Aug. 15, 2011 (JP) ................................ 2011-177679

(51) Int. Cl.
*H02G 3/18* (2006.01)

(52) U.S. Cl.
USPC .......... 174/659; 174/168; 174/71 R; 174/652; 439/501; 277/606

(58) Field of Classification Search
USPC ................ 174/168, 71 R, 652, 659; 403/390; 439/501; 277/606
See application file for complete search history.

(56) References Cited

U.S. PATENT DOCUMENTS 4,447,100 A * 5/1984 Dyce et al. ....................... 439/95
6,951,984 B2 * 10/2005 Buchberger .................. 174/360

FOREIGN PATENT DOCUMENTS

JP A-2006-115649 4/2006

* cited by examiner

*Primary Examiner* — Dhirubhai R Patel
(74) *Attorney, Agent, or Firm* — Scully, Scott, Murphy & Presser, PC

(57) ABSTRACT

A cable holding structure includes a shielded cable that includes a center conductor and a shield conductor on an outer periphery of the center conductor, and a holding portion being electrically conductive, provided on a flat plate portion and configured to hold the shielded cable. The holding portion includes a through-hole aligned in a direction intersecting with the flat plate portion. The shielded cable is held by the holding portion such that at least the center conductor is enclosed in the through-hole and the shield conductor is electrically connected to the conductive holding portion.

6 Claims, 10 Drawing Sheets

CABLE HOLDING STRUCTURE

The present application is based on Japanese patent application No. 2011-177679 filed on Aug. 15, 2011, the entire contents of which are incorporated herein by reference.

BACKGROUND OF THE INVENTION

1. Field of the Invention

The invention relates to a cable holding structure and, in particular, a cable holding structure for holding a shielded cable having a shield conductor on an outer periphery of a center conductor.

2. Description of the Related Art

Conventionally, an inverter device for supplying an electric current to a motor via a shielded cable having a shield conductor is known (see, e.g., JP-A-2006-115649).

This type of inverter device is configured such that three-phase alternating current (U, V, and W phases) of which frequency and current value are adjusted by PWM (Pulse Width Modulation) control is supplied through three shielded cables each shielded by a shield conductor.

Although a switching device such as IGBT (Insulated Gate Bipolar Transistor) is turned on and off at a high speed to generate three-phase alternating current, a harmonic component is superimposed on the three-phase alternating current due to the switching and high frequency electromagnetic noise is generated. An electric circuit of the inverter device is housed in a grounded case formed of a conductive metal in order to suppress generation of noise in a radio, etc., caused by the electromagnetic noise.

SUMMARY OF THE INVENTION

FIG. 10A is a diagram illustrating an example of a structure for connecting shielded cables, showing an outer surface of a case of a conventional inverter device. FIG. 10B is a cross sectional view showing a structure of the shielded cable.

As shown in FIGS. 10A and 10B, in each of three shielded cables 100, a sheath 104 formed of an insulating resin is removed at an end portion to be connected to a case 110 of an inverter device and an insulation 102 covering a center conductor 101 is exposed. A shield conductor 103 formed of a braid between the insulation 102 and the sheath 104 is bundled into one bundled wire 103*a* and is electrically connected to the case 110 by soldering or bolting, etc.

Electromagnetic noise emitted from a portion of the shielded cable 100 in which the shield conductor 103 covers the outer periphery of the center conductor 101 is attenuated by the shield conductor 103. However, since a portion in which the insulation 102 is exposed is not covered with the shield conductor 103, an adverse effect such as generation of noise in a radio may occur due to the electromagnetic noise emitted from such a portion.

Accordingly, it is an object of the invention to provide a cable holding structure which can reduce electromagnetic noise emitted from a shielded cable.

(1) According to one embodiment of the invention, a cable holding structure comprises:

a shielded cable that comprises a center conductor and a shield conductor on an outer periphery of the center conductor; and a holding portion being electrically conductive, provided on a flat plate portion and configured to hold the shielded cable, wherein the holding portion comprises a through-hole aligned in a direction intersecting with the flat plate portion, and wherein the shielded cable is held by the holding portion such that at least the center conductor is enclosed in the through-hole and the shield conductor is electrically connected to the conductive holding portion.

In the above embodiment (1) of the invention, the following modifications and changes can be made.

(i) The holding portion further comprises an opening to open the through-hole at a periphery in a radial direction thereof, wherein the shield conductor is in contact with the holding portion in the through-hole and partially exposed at the opening to an outside of the holding portion, and wherein the partially exposed shield conductor is pressed toward an inside of the through-hole in the radial direction.

(ii) The holding portion is formed columnar and further comprises a plurality of ones of the through-hole formed along a central axis of the holding portion, wherein a plurality of ones of the shielded cable are held by the holding portion, and wherein at least the center conductor of the shielded cable is enclosed in the through-hole.

(iii) In the shielded cables held by the holding portion, a plurality of ones of the shield conductor exposed at the opening are pressed together by an annular pressing member.

(iv) The holding portion further comprises an opening to open the through-hole at a periphery in a radial direction thereof, wherein the shield conductor of the shielded cable is crimped by a cylindrical conductive member and enclosed in the through-hole, and wherein the cylindrical conductive member exposed at the opening to an outside of the holding portion is pressed toward an inside of the through-hole.

(v) The holding portion is formed columnar and further comprises a plurality of ones of the through-hole formed along a central axis of the holding portion, wherein a plurality of ones of the shielded cable are held by the holding portion, wherein the shield conductor of the shielded cable is enclosed in each of the through-holes while being crimped by the cylindrical conductive member, and wherein a plurality of ones of the cylindrical conductive member exposed at the opening are pressed together by an annular pressing member.

(vi) The holding portion is formed cylindrical comprising the through-hole at a center thereof, wherein the shielded cable is pressed such that the shield conductor is in contact with a periphery of the cylindrical holding portion.

Points Of The Invention

According to one embodiment of the invention, a cable holding structure is constructed such that the center conductor of cables is accommodated in the through-hole of a holding portion. Thereby, electromagnetic noise emitted from the center conductor can be absorbed by the holding portion.

BRIEF DESCRIPTION OF THE DRAWINGS

Next, the present invention will be explained in more detail in conjunction with appended drawings, wherein:

FIGS. 1A and 1B show a cable holding structure in a first embodiment, wherein FIG. 1A is a perspective view showing a state before holding cables and FIG. 1B is a perspective view showing a state in which the shielded cables are held;

FIGS. 4A and 4B show a cable holding structure in a second embodiment, wherein FIG. 4A is an exploded perspective view and FIG. 4B is a cross sectional view taken on line C-C of FIG. 4A;

FIGS. 7A and 7B show a cable holding structure in a fourth embodiment, wherein FIG. 7A is a perspective view showing a state before holding cables and FIG. 7B is a perspective view showing a state in which the shielded cables are held;

DETAILED DESCRIPTION OF THE PREFERRED EMBODIMENTS

First Embodiment

Figure 1A:
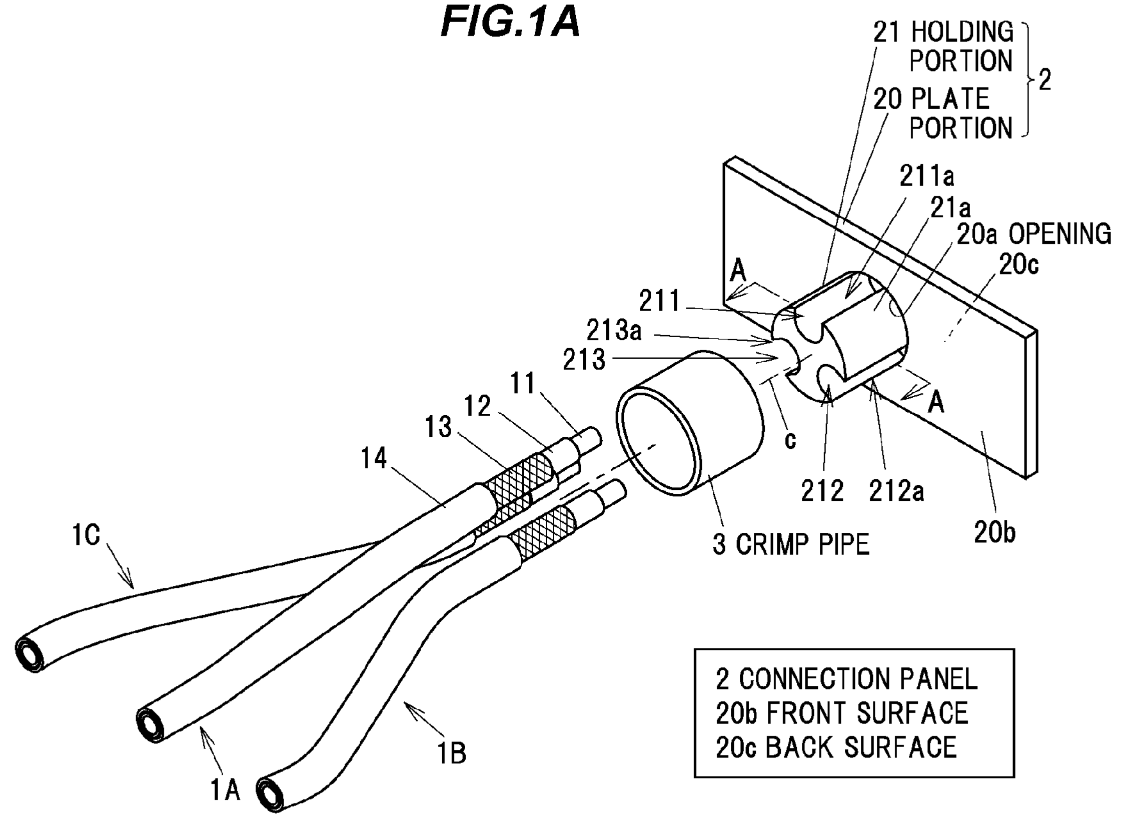
Figure 1B:
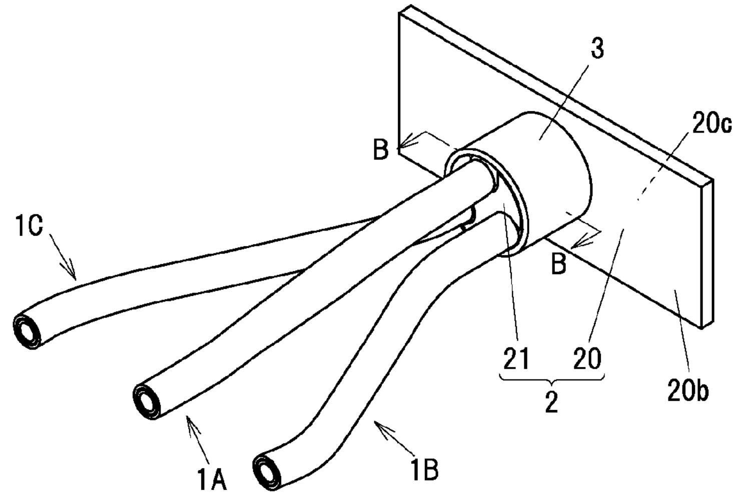
Figure 2A:
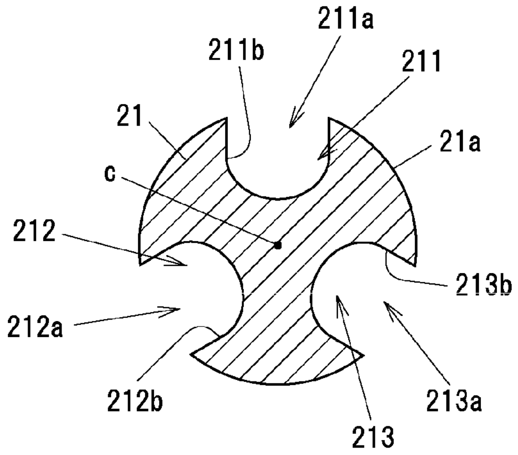
FIG. 2A is a cross sectional view taken on line A-A of FIG. 1A
Figure 2B:
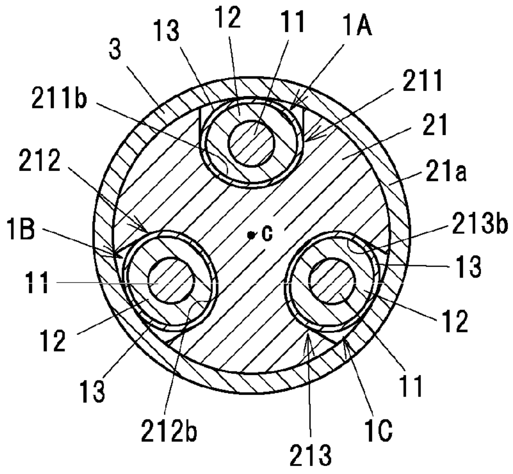
FIG. 2B is a cross sectional view taken on line B-B of FIG. 1B.

FIGS. 1A and 1B show a cable holding structure in the first embodiment of the invention, wherein FIG. 1A shows a state before holding three shielded cables 1A, 1B and 1C by a connection panel 2 and FIG. 1B shows a state in which the three shielded cables 1A, 1B and 1C are held by the connection panel 2. FIG. 2A is a cross sectional view taken on line A-A of FIG. 1A and FIG. 2B is a cross sectional view taken on line B-B of FIG. 1B.

The connection panel 2 is composed of a flat plate portion 20 and a columnar holding portion 21 provided thereon. A bolt (not shown) is inserted into an insertion hole (not shown) formed on the connection panel 2 and is screwed into a bolt hole formed on a case (not shown) of a device (e.g., an inverter device), thereby connecting and grounding the connection panel 2 to the case of the device (the same applies to the second, third and fourth embodiments). Note that, the connection panel 2 may be a portion of the case of the device (the same applies to the second, third and fourth embodiments). The plate portion 20 and the holding portion 21 are both formed of a metal having conductivity. In the first embodiment, the plate portion 20 and the holding portion 21 are separate parts and the columnar holding portion 21 is press-fitted into and fixed to a circular opening 20*a* formed on the plate portion 20. Alternatively, the plate portion 20 and the holding portion 21 may be formed integrally. The plate portion 20 is an example of a plate-like member in the invention.

The shielded cables 1A, 1B and 1C are held by the holding portion 21 and are crimped and fixed by an annular crimp pipe 3 formed of a metal having conductivity. Alternatively, the crimp pipe 3 may be formed of a resin.

The plate portion 20 is attached and electrically grounded to a case of, e.g., an inverter device which supplies three-phase alternating current to a motor as a drive source of a vehicle. Then, the shielded cables 1A, 1B and 1C are connected to, e.g., a terminal block in the inverter device to supply three-phase alternating current generated by PWM control to the motor.

Three through-holes 211, 212 and 213 are formed on the holding portion 21 along a central axis C thereof. In the first embodiment, the holding portion 21 is fixed so that the central axis C orthogonally crosses a front surface 20*b* of the plate portion 20. Accordingly, the through-holes 211, 212 and 213 are formed to extend in a direction orthogonally crossing the front surface 20*b* of the plate portion 20.

The three through-holes 211, 212 and 213 are formed at equal intervals in a circumferential direction about the central axis C of the holding portion 21. The three through-holes 211, 212 and 213 are open to the front surface 20*b* side of the plate portion 20 at one end in an extending direction thereof and are open to a back surface 20*c* side of the plate portion 20 at another end.

In addition, an outer peripheral opening 211*a* for opening the through-hole 211 to the outside in a radial direction thereof, an outer peripheral opening 212*a* for opening the through-hole 212 to the outside in a radial direction thereof and an outer peripheral opening 213*a* for opening the through-hole 213 to the outside in a radial direction thereof are formed on the holding portion 21. The outer peripheral openings 211*a*, 212*a* and 213*a* are formed along the through-holes 211, 212 and 213 over the entire length thereof. In other words, on the holding portion 21, three grooves (corresponding to the through-holes 211, 212 and 213) having a depth in a radial direction from the outer peripheral openings 211*a*, 212*a* and 213*a* formed on an outer peripheral surface 21*a* toward the central axis C are formed parallel to the central axis C.

The shielded cables 1A, 1B and 1C each have a center conductor 11, an insulation 12 covering the center conductor 11, a shield conductor 13 formed of a braid and arranged on the outer peripheral side of the center conductor 11 and the insulation 12, and a sheath 14 covering the outer peripheral side of the shield conductor 13. The center conductor 11 and the shield conductor 13 are formed of a conductive metal such as copper or aluminum. The insulation 12 and the sheath 14 are formed of an insulating resin.

Each sheath 14 of the shielded cables 1A, 1B and 1C is peeled off at one end over the length of the holding portion 21 or longer in the direction of the central axis C, and the portions without the sheath 14 are respectively accommodated in the through-holes 211, 212 and 213 of the holding portion 21.

In more detail, as shown in FIG. 2B, the center conductor 11, the insulation 12 and the shield conductor 13 of the shielded cable 1A are accommodated in the through-hole 211 of the holding portion 21, and the shield conductor 13 of the shielded cable 1A is in contact with an inner surface 211*b* of the through-hole 211. Then, the center conductor 11, the insulation 12 and the shield conductor 13 of the shielded cable 1B are accommodated in the through-hole 212 of the holding portion 21, and the shield conductor 13 of the shielded cable 1B is in contact with an inner surface 212*b* of the through-hole 212. In addition, the center conductor 11, the insulation 12 and the shield conductor 13 of the shielded cable 1C are accommodated in the through-hole 213 of the holding portion 21, and the shield conductor 13 of the shielded cable 1C is in contact with an inner surface 213*b* of the through-hole 213.

Due to the contact with the inner surfaces 211*b*, 212*b* and 213*b* of the through-holes 211, 212 and 213, the shield conductors 13 of the shielded cables 1A, 1B and 1C are electrically connected and grounded to the holding portion 21.

As shown in FIGS. 1B and 2B, in the region in which the shielded cables 1A, 1B and 1C are held by the holding portion 21, the shield conductor 13 is partially exposed from the outer peripheral openings 211*a*, 212*a* and 213*a* to the outside of the holding portion 21 and the exposed portions of the shield conductors 13 are pressed by the crimp pipe 3 toward the inside of the through-holes 211, 212 and 213 (i.e., toward the central axis C).

In other words, the crimp pipe 3 presses the shield conductors 13 protruding from the outer peripheral openings 211*a*, 212*a* and 213*a* to the outside of the through-holes 211, 212 and 213 all together so as to pushes the shield conductors 13 into the through-holes 211, 212 and 213. Accordingly, the shield conductors 13 of the shielded cables 1A, 1B and 1C are in pressure contact with the holding portion 21 and the crimp pipe 3. In addition, the crimp pipe 3 is electrically grounded due to the contact with the shield conductors 13 and the outer peripheral surface 21*a* of the holding portion.

Functions and Effects of the First Embodiment

The following functions and effects are obtained in the first embodiment.

(1) Since the center conductors 11 are accommodated in the through-holes 211, 212 and 213 of the holding portion 21 on the front surface 20*b* side of the plate portion 20, electromagnetic noise emitted from the center conductors 11 is absorbed by the holding portion 21. Especially, in the first embodiment, since the radially outside area of the center conductor 11 is entirely surrounded by the grounded conductive members (the shield conductor 13, the holding portion 21 and the crimp pipe 3), electromagnetic noise emitted from the region in which the shielded cables 1A, 1B and 1C are held by the holding portion 21 is greatly reduced.

(2) Since the three shielded cables 1A, 1B and 1C are held by the columnar holding portion 21 at equal intervals in a circumferential direction, the three shielded cables 1A, 1B and 1C are arranged closer to each other than the case of, e.g., linearly arranging the shielded cables 1A, 1B and 1C. Accordingly, electromagnetic noises emitted from the respective shielded cables 1A, 1B and 1C cancel out each other and electromagnetic noise is thus further reduced. In addition, it is possible to contribute to downsizing and weight reduction of the holding portion 21.

(3) Since the shield conductors 13 of the three shielded cables 1A, 1B and 1C are pressed all together by the crimp pipe 3, an increase in the number of parts is suppressed.

Figure 3:
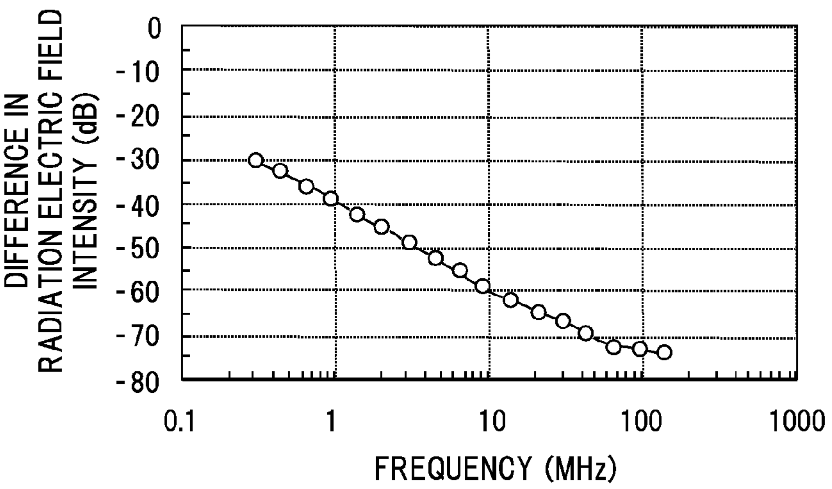
FIG. 3 is a graph showing radiation electric field intensity in the first embodiment.
Figure 10A:
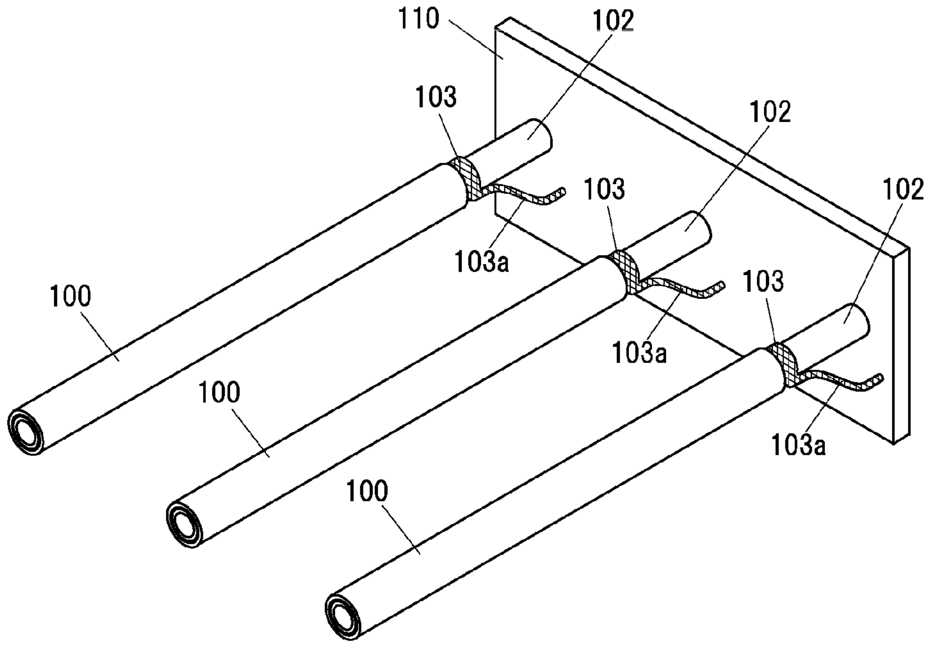
FIG. 10A is a diagram illustrating an example of a structure for connecting cables with shield, showing an outer surface of a case of a conventional inverter device.
Figure 10B:
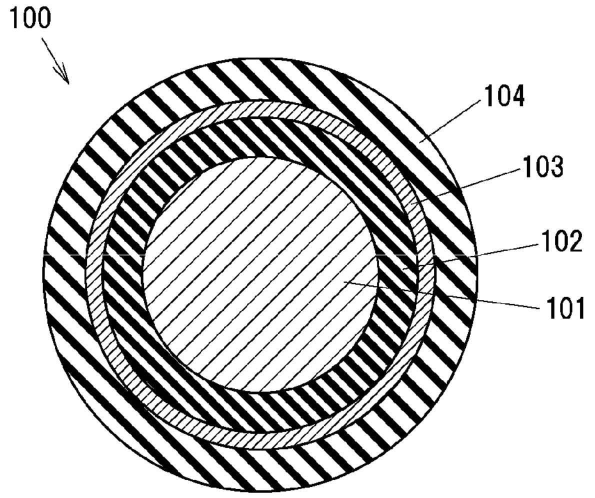
FIG. 10B is a cross sectional view showing a structure of the cables with shield.

FIG. 3 is a graph showing radiation electric field intensity at a position 1 meter away from end portions of the shielded cables 1A, 1B and 1C (the holding portion 21) based on comparison with that of a conventional example (FIG. 10). In the graph, the horizontal axis indicates frequency of current flowing through the shielded cables 1A, 1B and 1C and the vertical axis is a decibel value indicating a difference between radiation electric field intensity in the first embodiment and that of the conventional example.

As shown in FIG. 3, not less than 30 dB of attenuation is observed in a frequency region of not less than 300 kHz, not less than 40 dB of attenuation in a frequency region of not less than 1 MHz and not less than 60 dB of attenuation in a frequency region of not less than 10 MHz.

Second Embodiment

Figure 4A:
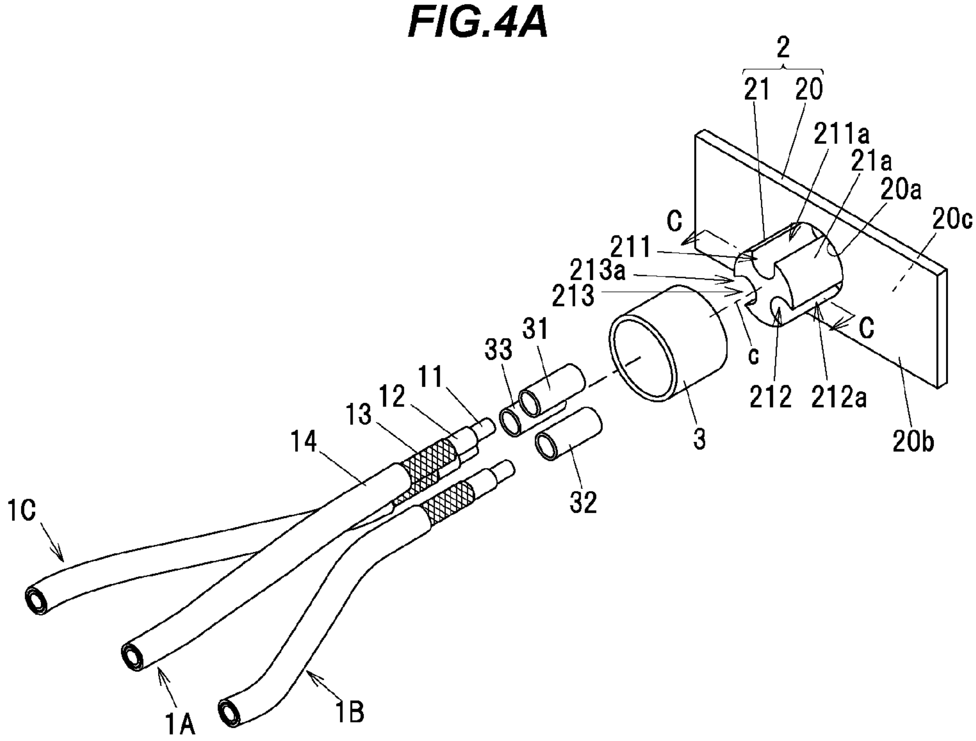
Figure 4B:
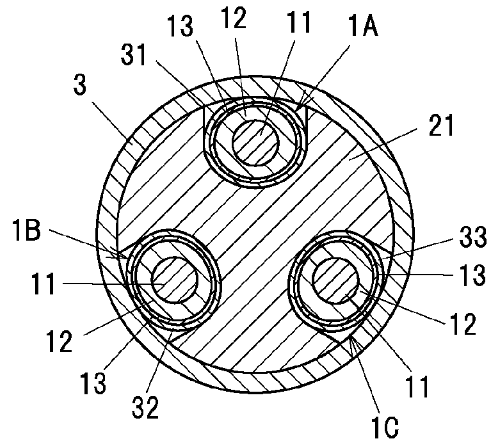

FIGS. 4A and 4B show a cable holding structure in a second embodiment, wherein FIG. 4A is an exploded perspective view and FIG. 4B is a cross sectional view taken on line C-C of FIG. 4A. Members having the same functions as those described in the first embodiment are denoted by the same reference numerals in FIGS. 4A and 4B, and the overlapped explanation will be omitted.

In the first embodiment, the shield conductors 13 of the shielded cables 1A, 1B and 1C are directly in contact with the inner surfaces 211*b*, 212*b* and 213*b* of the through-holes 211, 212 and 213. On the other hand, in the second embodiment, the shield conductors 13 of the shielded cables 1A, 1B and 1C are respectively crimped by cylindrical small diameter crimp pipes 31 to 33 each formed to have a smaller diameter than the crimp pipe 3 and are then held in the through-holes 211, 212 and 213. The small diameter crimp pipes 31 to 33 are formed of a metal having conductivity such as copper, etc. The small diameter crimp pipes 31 to 33 are an example of a cylindrical conductive member in the invention.

In more detail, the shield conductor 13 of the shielded cable 1A is crimped by the small diameter crimp pipe 31 and is held in the through-hole 211 of the holding portion 21. In addition, the shield conductor 13 of the shielded cable 1B is crimped by the small diameter crimp pipe 32 and is held in the through-hole 212 of the holding portion 21. Likewise, the shield conductor 13 of the shielded cable 1C is crimped by the small diameter crimp pipe 33 and is held in the through-hole 213 of the holding portion 21.

The through-holes 211, 212 and 213 of the holding portion 21 have the outer peripheral openings 211*a*, 212*a* and 213*a*, and the small diameter crimp pipes 31 to 33 exposed from the outer peripheral openings 211*a*, 212*a* and 213*a* to the outside of the holding portion 21 are pressed by the crimp pipe 3 toward the inside of the through-holes 211, 212 and 213.

Functions and Effects of the Second Embodiment

In the second embodiment, since the shield conductors 13 of the shielded cables 1A, 1B and 1C are individually crimped and pressure-contact by the small diameter crimp pipes 31 to 33 and the small diameter crimp pipes 31 to 33 are in pressure contact with the holding portion 21 by the crimp pipe 3, mechanical strength at a connecting portion between the shielded cables 1A, 1B, 1C and the holding portion 21 is improved and electrical contact resistance between the shield conductor 13 and the holding portion 21 is reduced, in addition to the functions and effects (1) and (2) described in the first embodiment.

Note that, when the through-holes 211, 212 and 213 are formed into a shape corresponding to the shape after crimping by the small diameter crimp pipes 31 to 33, it is possible to further improve mechanical strength and to reduce electrical contact resistance.

Third Embodiment

Next, the third embodiment of the invention will be described in reference to FIGS. 5 to 6C. Members having the same functions as those described in the first embodiment are denoted by the same reference numerals in FIGS. 5 to 6C, and the overlapped explanation will be omitted.

Figure 5:
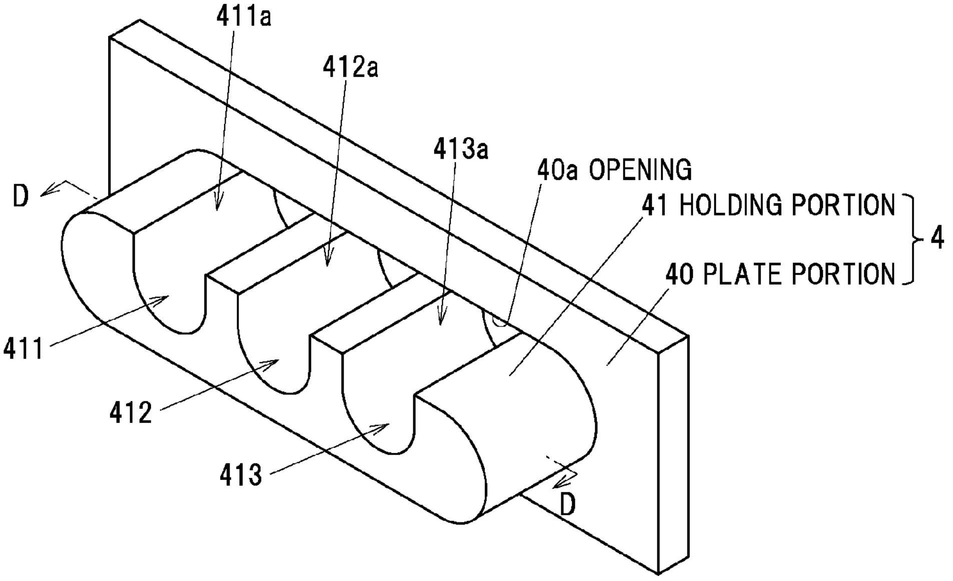
FIG. 5 is a perspective view showing a connection panel in a third embodiment.

FIG. 5 is a perspective view showing a connection panel 4 in the third embodiment.

In the connection panel 4 in the third embodiment, a holding portion 41 is press-fitted into and fixed to a rounded-rectangle-shaped opening 40*a* formed on a flat plate portion 40.

Three through-holes 411, 412 and 413 extending in a direction crossing the plate portion 40 are formed on the holding portion 41 so as to be aligned in one direction. In the third embodiment, the through-holes 411, 412 and 413 are formed along a direction orthogonal to the plate portion 40 so as to be parallel to each other.

In addition, an outer peripheral opening 411*a* for opening the through-hole 411 to the outside in a radial direction thereof, an outer peripheral opening 412*a* for opening the through-hole 412 to the outside in a radial direction thereof and an outer peripheral opening 413*a* for opening the through-hole 413 to the outside in a radial direction thereof are formed on the holding portion 41. The outer peripheral openings 411*a*, 412*a* and 413*a* are formed along the through-holes 411, 412 and 413 over the entire length thereof.

Figure 6A:
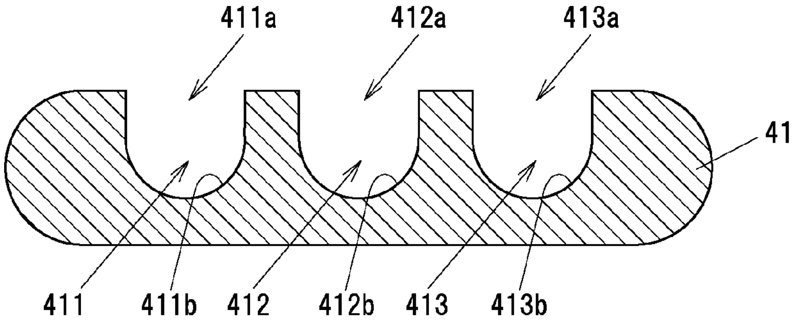
FIG. 6A is a cross sectional view taken on line D-D of FIG. 5.
Figure 6B:
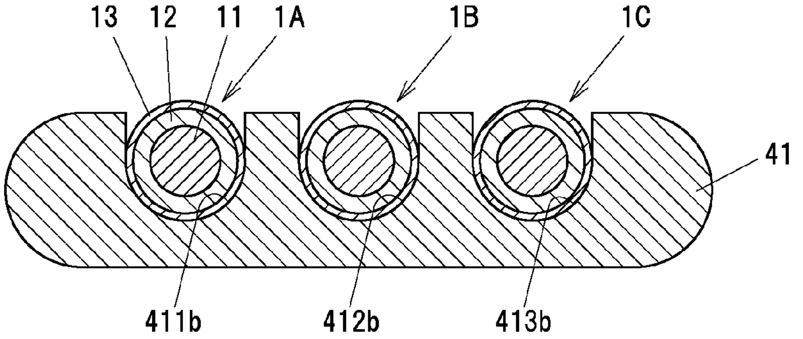
FIG. 6B is an explanatory diagram illustrating a state in which shielded cables are accommodated in a holding portion and FIG. 6C is an explanatory diagram illustrating a state in which the holding portion and the shielded cables are crimped by a crimp pipe.
Figure 6C:
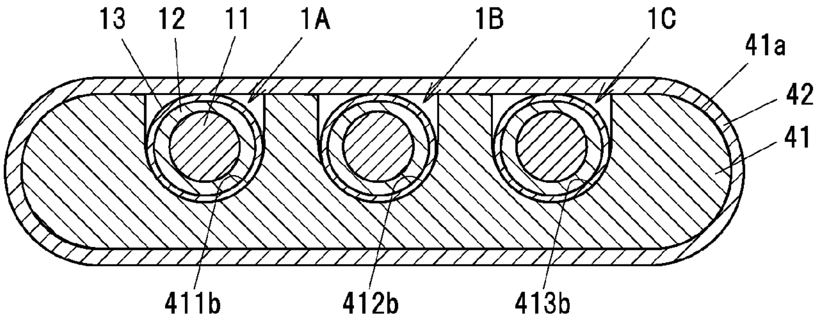

FIGS. 6A to 6C show the holding portion 41 and the shielded cables 1A, 1B and 1C, wherein FIG. 6A is a cross sectional view taken on line D-D of FIG. 5, FIG. 6B is an explanatory diagram illustrating a state in which the shielded cables 1A, 1B and 1C are accommodated in the holding portion 41 and FIG. 6C is an explanatory diagram illustrating a state in which the holding portion 41 and the shielded cables 1A, 1B and 1C are crimped by a crimp pipe 42.

As shown in FIG. 6B, in the state that the shielded cables 1A, 1B and 1C are accommodated in the through-holes 411, 412 and 413 of the holding portion 41, portions of the shield conductors 13 of the shielded cables 1A, 1B and 1C are in contact with inner surfaces 411*b*, 412*b* and 413*b* of the through-holes 411, 412 and 413 and other portions of the shield conductors 13 are protruding from the outer peripheral openings 411*a*, 412*a* and 413*a* to the outside of the through-holes 411, 412 and 413.

As shown in FIG. 6C, the shielded cables 1A, 1B and 1C are crimped by the crimp pipe 42 and are fixed to the holding portion 41. That is, the crimp pipe 42 presses the shield conductors 13 protruding from the outer peripheral openings 411*a*, 412*a* and 413*a* to the outside of the through-holes 411, 412 and 413 all together so as to pushes the shield conductors 13 into the through-holes 411, 412 and 413. Accordingly, the shield conductors 13 of the shielded cables 1A, 1B and 1C are in pressure contact with the holding portion 41 and the crimp pipe 42.

Functions and Effects of the Third Embodiment

The third embodiment achieves the same functions and effects as (1) described in the first embodiment. In addition, it is possible to reduce the size of the holding portion 41 in a thickness direction (a vertical direction in FIGS. 5 to 6C).

Fourth Embodiment

Next, the fourth embodiment of the invention will be described in reference to FIGS. 7A to 8. Members having the same functions as those described in the first embodiment are denoted by the same reference numerals in FIGS. 7A to 8, and the overlapped explanation will be omitted.

Figure 7A:
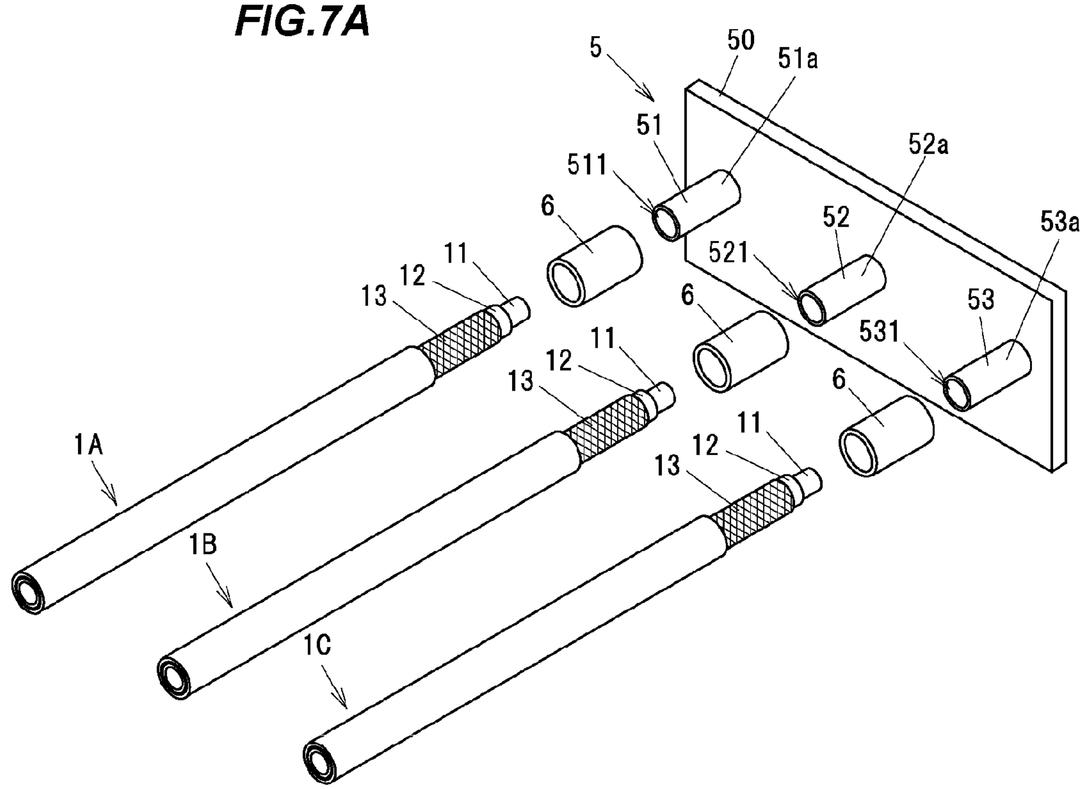
Figure 7B:
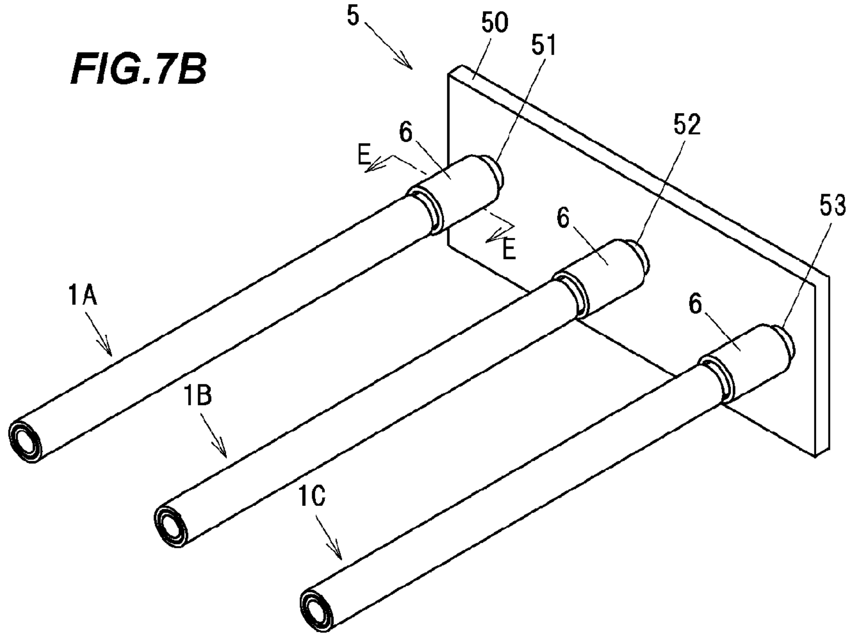

FIGS. 7A and 7B show a cable holding structure in a fourth embodiment of the invention, wherein FIG. 7A shows a state before holding the shielded cables 1A, 1B and 1C by a connection panel 5 and FIG. 7B shows a state in which the shielded cables 1A, 1B and 1C are held by the connection panel 5. FIG. 8 is a cross sectional view taken on line E-E of FIG. 7B.

The connection panel 5 is composed of a flat plate portion 50 and circular cylinders 51 to 53 provided thereon. The plate portion 50 and the cylinders 51 to 53 are formed of a metal having conductivity. The cylinders 51 to 53 function as a holding portion for holding the shielded cables 1A, 1B and 1C.

Through-holes 511, 512 and 513 extending in a direction orthogonally crossing the plate portion 50 are formed at respective center portions of the cylinders 51 to 53.

Figure 8:
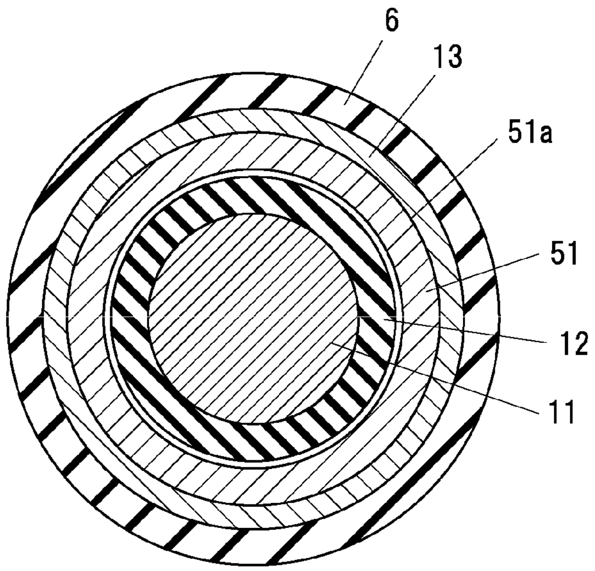
FIG. 8 is a cross sectional view taken on line E-E of FIG. 7B.

As shown in FIG. 8, the center conductor 11 and the insulation 12 of the shielded cable 1A are accommodated in the through-hole 511 of the cylinder 51. The shield conductor 13 of the shielded cable 1A is stretched so as to enlarge an inner diameter thereof and is arranged so as to be in contact with an outer peripheral surface 51*a* of the cylinder 51. The shield conductor 13 is pressed against the outer peripheral surface 51*a* of the cylinder 51 by an annular crimp pipe 6 formed of a metal having conductivity. Alternatively, the crimp pipe 6 may be formed of a resin.

Likewise, the center conductor 11 and the insulation 12 of the shielded cable 1B are accommodated in the through-hole 512 of the cylinder 52 and the shielded cable 1B is pressed by the crimp pipe 6 so that the shield conductor 13 is in contact with an outer peripheral surface 52*a* of the cylinder 52.

Also, in the same manner, the center conductor 11 and the insulation 12 of the shielded cable 1C are accommodated in the through-hole 513 of the cylinder 53 and the shielded cable 1C is pressed by the crimp pipe 6 so that the shield conductor 13 is in contact with an outer peripheral surface 53*a* of the cylinder 53.

Functions and Effects of the Fourth Embodiment

The fourth embodiment achieves the same functions and effects as (1) described in the first embodiment. In addition, since the shield conductor 13 is crimped while being sandwiched between the cylinder 51 and the crimp pipe 6, electrical contact resistance between the shield conductors 13 and the cylinders 51 to 53 is reduced.

Figure 9:
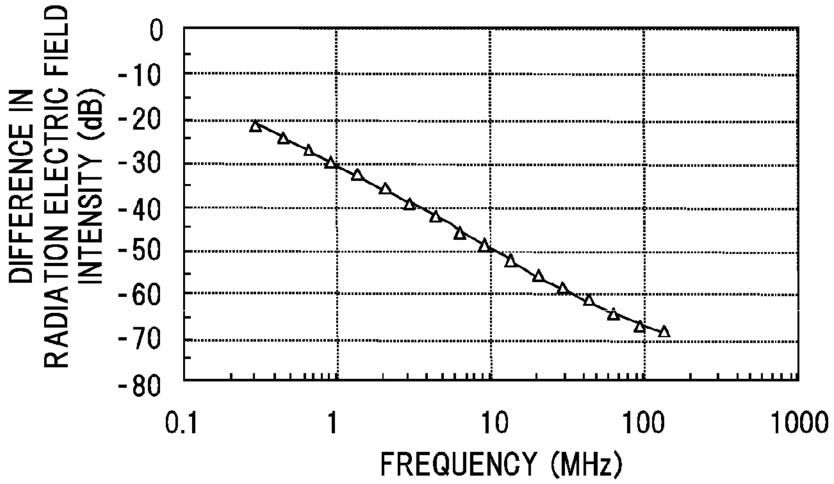
FIG. 9 is a graph showing radiation electric field intensity in the fourth embodiment.

FIG. 9 is a graph showing radiation electric field intensity at a position 1 meter away from end portions of the shielded cables 1A, 1B and 1C based on comparison with that of the conventional example (FIG. 10). In the graph, the horizontal axis indicates frequency of current flowing through the shielded cables 1A, 1B and 1C and the vertical axis is a decibel value indicating a difference between radiation electric field intensity of the fourth embodiment and that of the conventional example.

As shown in FIG. 9, not less than 28 dB of attenuation is observed in a frequency region of not less than 300 kHz, not less than 30 dB of attenuation in a frequency region of not less than 1 MHz and not less than 50 dB of attenuation in a frequency region of not less than 10 MHz.

Although the embodiments of the invention have been described, the invention according to claims is not to be limited to the above-mentioned embodiments. Further, it should be noted that all of the combinations of features as described in the embodiment and Examples are not always needed to solve the problem of the invention.

What is claimed is:

1. A cable holding structure to hold a shielded cable that comprises a center conductor and a shield conductor provided around the center conductor, comprising:

a flat plate portion;

a holding portion being electrically conductive, provided on the flat plate portion and configured to hold the shielded cable;

a through-hole being disposed in the holding portion and extending in a direction intersecting with the flat plate portion, to receive at least the center conductor of the shielded cable in the through-hole with the holding portion being electrically connected to the shield conductor of the shielded cable;

an outer peripheral opening provided on the holding portion and along the through-hole, with the through-hole being open outward in a radial direction of the holding portion, the shield conductor being in contact with an inner surface of the through-hole and the shield conductor being partially exposed outward from the outer peripheral opening on the holding portion; and an annular pressing member which presses the partially exposed portion of the shield conductor into the through-hole.

2. The cable holding structure according to claim 1, wherein the holding portion is columnar, including a plurality of the through-holes formed along a central axis of the holding portion, thereby holding a plurality of the shielded cables in the holding portion, wherein at least the respective center conductors of the plurality of the shielded cables are received in the plurality of the through-holes, respectively.

3. The cable holding structure according to claim 2, wherein with the plurality of the shielded cables being held in the holding portion, the respective shield conductors exposed from the outer peripheral openings respectively are being pressed together by the annular pressing member.

4. The cable holding structure according to claim 1, further comprising a cylindrical electrically conductive member to caulk the shield conductor and receive the shielded cable in the through-hole, wherein the cylindrical electrically conductive member exposed outward from the outer peripheral opening on the holding portion is being pressed into the through-hole.

5. The cable holding structure according to claim 4, wherein the holding portion is columnar, including a plurality of the through-holes formed along a central axis of the holding portion, to hold a plurality of the shielded cables in the holding portion, wherein the respective shield conductors of the plurality of the shielded cables are caulked with the cylindrical electrically conductive members respectively and received in the plurality of the through-holes respectively, and wherein the cylindrical electrically conductive members exposed from the outer peripheral openings respectively are being pressed together by the annular pressing member.

6. The cable holding structure according to claim 1, wherein the holding portion is cylindrical, including an outer surface and the through-hole formed in a center thereof, and wherein the shielded cable is being pressed such that the shield conductor is in contact with the outer surface of the cylindrical holding portion.

* * * * *